(12) United States Patent
Pettersson et al.

(10) Patent No.: US 12,065,123 B2
(45) Date of Patent: Aug. 20, 2024

(54) METHODS AND SYSTEMS FOR POWER LEVEL ADJUSTMENT

(71) Applicant: Ford Global Technologies, LLC, Dearborn, MI (US)

(72) Inventors: Lars Niklas Pettersson, Novi, MI (US); Kevin Groot, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 316 days.

(21) Appl. No.: 17/547,140

(22) Filed: Dec. 9, 2021

(65) Prior Publication Data

US 2023/0182713 A1 Jun. 15, 2023

(51) Int. Cl.
  *B60W 20/00* (2016.01)
  *B60W 20/12* (2016.01)

(52) U.S. Cl.
  CPC ......... *B60W 20/12* (2016.01); *B60W 2300/28* (2013.01); *B60W 2510/244* (2013.01); *B60W 2540/043* (2020.02); *B60W 2540/215* (2020.02); *B60W 2540/30* (2013.01); *B60W 2552/05* (2020.02); *B60W 2555/20* (2020.02); *B60W 2556/45* (2020.02)

(58) Field of Classification Search
  CPC ............. B60W 20/12; B60W 2300/28; B60W 2510/244; B60W 2540/043; B60W 2540/215; B60W 2540/30; B60W 2552/05; B60W 2555/20; B60W 2556/45; B60W 2050/146; B60W 2510/0676; B60W 2520/10; B60W 2556/10; B60W 20/18; B60W 50/14; B60W 20/16; B60W 2556/50; B60K 2370/166; B60K 2370/174; B60K 35/00; Y02T 10/70
  See application file for complete search history.

(56) References Cited

U.S. PATENT DOCUMENTS

| | | | |
|---|---|---|---|
| 9,180,789 B2 | 11/2015 | Higashitani et al. | |
| 9,428,178 B2 | 8/2016 | Johri et al. | |
| 10,414,357 B1 | 9/2019 | Sorensen | |
| 11,055,670 B1 * | 7/2021 | Shillig | G06Q 10/1093 |
| 2013/0275023 A1 | 10/2013 | Gregg et al. | |
| 2018/0170349 A1 * | 6/2018 | Jobson | B60W 20/12 |
| 2018/0215281 A1 * | 8/2018 | Basler | B60L 11/1864 |
| 2018/0357842 A1 * | 12/2018 | Usamer | G07C 5/0825 |

(Continued)

FOREIGN PATENT DOCUMENTS

| | | | | |
|---|---|---|---|---|
| DE | 102020004796 A1 * | 11/2020 | | B60W 10/06 |
| DE | 102021123050 A1 * | 9/2021 | | B60W 30/188 |

OTHER PUBLICATIONS

Crawford, K. "The HPDE/ Track Day Checklist You Should Use For Every Event", Jun. 10, 2020 (Year: 2020).*

*Primary Examiner* — Russell Frejd
*Assistant Examiner* — Brittany Renee Peko
(74) *Attorney, Agent, or Firm* — David Kelley; McCoy Russell LLP

(57) ABSTRACT

Methods and systems are provided for adjusting a power output strategy at a track. In one example, a method may include customizing the power output strategy in response to user inputs. The power output strategy may be associated with a user profile stored in an application, the user profile further comprising items desired by the user for a track day along with post-track day debriefs including data with regard to previous track days.

20 Claims, 6 Drawing Sheets

(56) References Cited

U.S. PATENT DOCUMENTS

2020/0184849 A1\* 6/2020 Spence ................ G09B 19/167
2020/0254992 A1 8/2020 Langhorst
2022/0086534 A1\* 3/2022 Allen ................ H04N 21/8126
2022/0129861 A1\* 4/2022 Hinduja ................ G06Q 10/20

\* cited by examiner

METHODS AND SYSTEMS FOR POWER LEVEL ADJUSTMENT

FIELD

The present description relates generally to adjusting a vehicle power level automatically and/or in response to user inputs.

BACKGROUND/SUMMARY

Vehicle manufactures may increase an electrification of a vehicle fleet in order to reduce greenhouse emissions. Electric vehicles (EVs) may be used to describe vehicles including at least one electric motor for vehicle propulsion, such as battery electric vehicles (BEV) and hybrid electric vehicle (HEV). A BEV may include at least one electric motor, wherein an energy source for the motor is a battery that is rechargeable from an external electric grid. A HEV may include an internal combustion engine (ICE) and one or more electric motors, wherein the energy source for the engine is fuel and the energy source for the motors is a battery.

During some conditions, a default factory output power of the EV may be sufficient to meet driver demand. During some other conditions, the default factory output power may be too low. Additionally or alternatively, the default factory output power may be inconsistent due battery state-of-charge (SOC) and component temperatures. Thus, customers may be dissatisfied with EV performance during certain conditions.

One example approach for adjusting an EV power output is shown in U.S. 2020/0254992 A1 by Langhorst. Therein, a geolocation of EV is determined. If the geolocation corresponds to a location where increased power output may be desired, such as at a track, then EV conditions may be learned at various areas of the track. The power output may then be adjusted in areas where more power is available and reduced in areas where component temperatures are too high.

However, the inventors have identified some issues with the approaches described above. For example, customers may drive multiple laps during a lap day. Battery SOC and component temperatures may vary between laps based on a charge rate and delay between laps. Customers may desire a greater degree of power customization for certain laps.

In one example, the issues described above may be addressed by a method for a vehicle with a traction battery. The method may include adjusting a power output strategy of the battery automatically or based on user inputs via an application, wherein the power output strategy is for one or more laps at a track. For example, the strategy may be selected based on a determination that the vehicle is performing a track lap. In this way, a customer may provide inputs prior to and after a lap to tailor power output strategies while also tracking usage of various track day components.

As one example, a controller, in wireless communication with an application, may receive one or more inputs from the customer via an interactive display device, such as a touch screen of a navigation system, and/or through a smartphone of the customer. Power output strategies may be associated to a user profile in the application corresponding to different tracks. The power output strategies may be further tailored based on data received from other vehicles at the track. The data may be filtered to analyze data from vehicles with identical make and model along with similar user characteristics. The user profile may be further customizable to include items the user brings with them to the track. A checklist may include the items along with maintenance actions. By doing this, a track day experience may be enhanced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for lap learning for vehicle energy management optimization. The systems and methods may relate to optimization of electrical features of a vehicle for driving on a track. In one example, the track is a race track. The race track may be a facility for users to race vehicles along a closed course, separate from other vehicles. The race track may be free of speed limits and include various features including tight turns, straightaways, and the like. Thus, a requested power output of the vehicle may be increased at the race track relative to open roads, highways, and the like.

Figure 1:
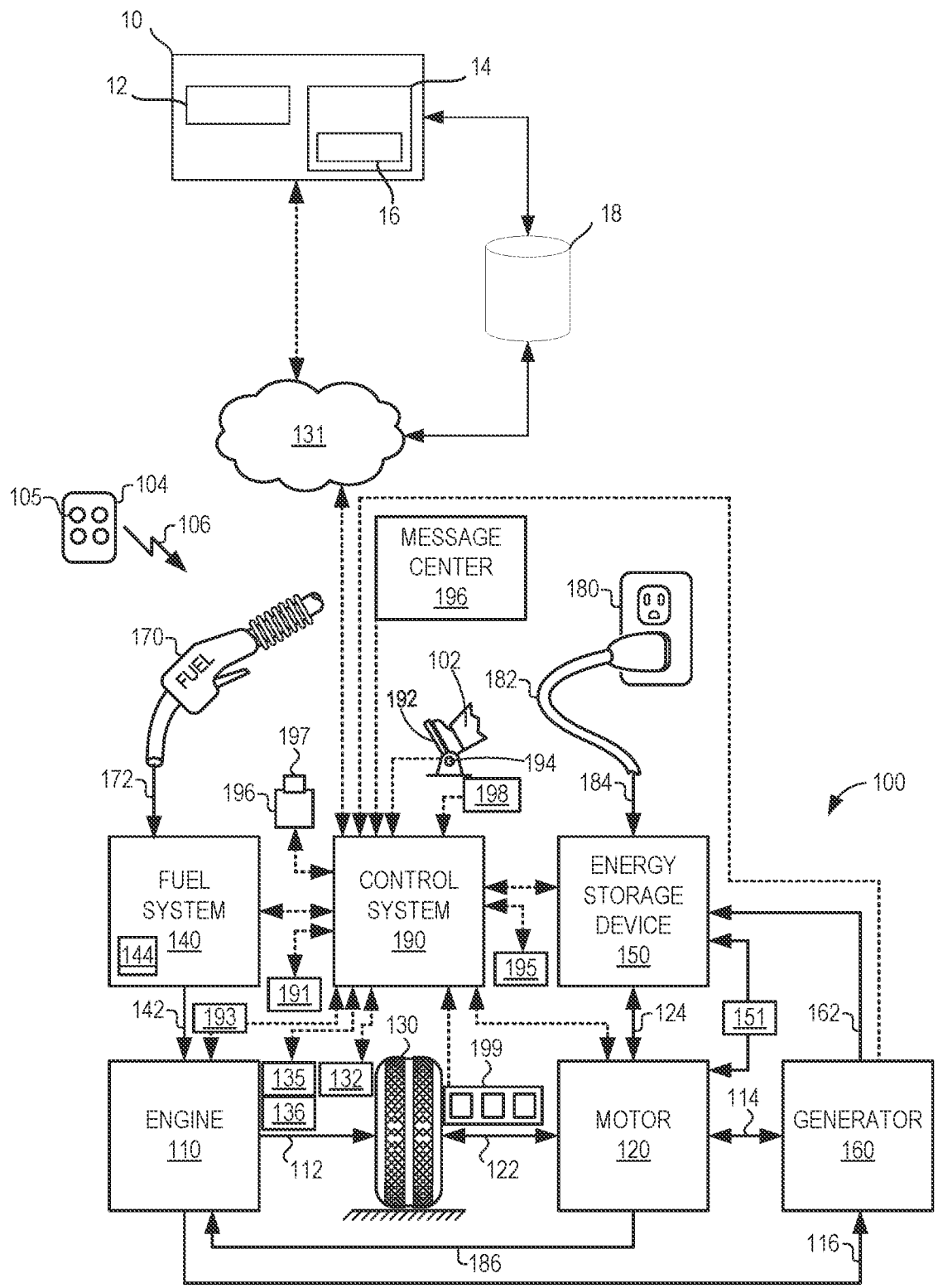
FIG. 1 illustrates a schematic of an electric vehicle in wireless communication with a network.

An electric motor coupled to a traction battery may be arranged in a vehicle, as shown in FIG. 1. The vehicle of FIG. 1 is illustrated as a hybrid electric vehicle, however, it will be appreciated that the methods included herein may be used in all-electric vehicle applications as well. FIGS. 2-6 illustrate routines for optimizing power output of a vehicle at a track, along with improving track day logistics for a user.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV). In some examples, vehicle propulsion system 100 may be all-electric and include only the motor 120.

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 230 as indicated by arrow 122 while engine 110 is deactivated, which may herein be referred to as an electric-only operation.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162. In some examples, the engine 110 may deactivate during regenerative braking and traction at the drive wheel 130 may be negative, such that the motor 120 may spin in reverse and recharge the energy storage device 150. Thus, regenerative braking may be distinguished from an electric-only operation, where the motor 120 may provide positive traction at the drive wheel 130, thereby decreasing a SOC of the energy storage device 150 while the engine 110 is deactivated.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated, such as during a charge-sustaining operation. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system or a hybrid propulsion. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated by power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

In still other examples, which will be discussed in further detail below, motor 120 may be configured to rotate engine unfueled in a forward (e.g. default orientation) or reverse orientation, using energy provided via energy storage device 150, exemplified by arrow 186.

In some examples, the vehicle may be an all-electric vehicle wherein engine 110 and corresponding fuel components may be omitted. The energy storage device 150 may be configured as a traction battery configured to power motor 120 to drive the vehicle.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of diesel and biodiesel, gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors. In some examples, increasing the electrical energy supplied from the energy storage device 150 may decrease an electric-only operation range, as will be described in greater detail below. In one example, the energy storage device 150 is a battery.

Control system 190 may communicate with one or more of engine 110, motor 120, fuel system 140, energy storage device 150, and generator 160. In some examples, control system 190 may be used as a controller, a processor, or other computing device. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. In some examples, control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

In some examples, additionally or alternatively, the vehicle propulsion system 100 may be configured to operate autonomously (e.g., without a human vehicle operator). As such, the control system 190 may determine one or more desired operating engine conditions based on estimated current driving conditions.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnect between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

The energy storage device 150 and the electric motor 120 may be fluidly coupled to a cooling system 151. The cooling system 151 may regulate temperatures of the energy storage device 150 and the electric motor 120 based on signals from the control system 190. The control system 190 may determine various desired coolant flow temperature based on feedback from one or more temperature sensors arranged in coolant passages and/or chambers of the energy storage device 150 and the electric motor 120.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), vehicle-to-infrastructure (V2I), and/or vehicle-to-everything (V2X) technology. The communication and the information exchanged between vehicles can be either directly between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art. One example of a V2V communication device may include dedicated-short-range-communication (DSRC) network which may allow vehicles within a threshold proximity (e.g., 5,000 feet) to communicate (e.g., transfer information) free of an internet connection.

The wireless network 131 may include one or more computing systems (e.g., servers) including memory and one or more processors. The memory may be configured to store various anomaly detection/remaining useful life determination models as described herein, as well as various data provided thereto, including vehicle operational/sensor data obtained from multiple vehicles.

More specifically, the wireless network 131 may include an application central server 10 includes a processor 12, memory 14, and a track day application 16 stored as instructions in memory 14. The processor 12 may execute the track day application 16 and communicatively interface with the control system 190 via a smart phone, a laptop, a tablet, an interactive display of a vehicle infotainment system, and the like via the wireless network 131.

The track day application 16, herein referred to as the application 16, may be configured to associate user profiles to a plurality of users. Each user may drive a corresponding vehicle on a track, which may result in an associated power output strategy being generated and stored in their user profile. The power output strategy may then be executed upon a subsequent track day at an identical track. For users driving identical vehicle makes and models, data may be shared therebetween such that power output strategies used on a first vehicle may be used on a second vehicle. The application 16 may further include updating a user profile based on items brought to the track day. A checklist may be provided to the user prior to a track day as a reminder to bring one or more items previously brought to the track.

In this way, vehicle hardware of the vehicle propulsion system 100 may determine various vehicle conditions, such as vehicle conditions at a track during a track day, and wirelessly communicate the vehicle conditions to the central server 10 via the control system 190 and wireless network 131. The control system 190 and the processor 12 may be used in combination to determine a power output strategy for the vehicle for a future lap. The power output strategy may be determined based on user inputs regarding user preferences and/or powertrain temperatures, coolant temperatures and pressures, a battery SOC, other vehicle power output strategies, and the like. The application 16, via the database 18, may store information provided by a plurality of users to a plurality of user profiles, wherein each user profile is unique to each user based on user preferences, track day times, track day preferences, purchases through a marketplace in the application, and so on. The application 16 is described in greater detail below.

Vehicle propulsion system 100 may also include an onboard navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc.

In some examples, vehicle propulsion system 100 may include one or more onboard cameras 135. Onboard cameras 135 may communicate photos and/or video images to control system 190, for example. Onboard cameras may in some examples be utilized to record images within a predetermined radius of the vehicle, for example. The onboard cameras 135 may be arranged on an exterior surface of the vehicle so that an area surrounding and/or adjacent to the vehicle may be visualized.

FIGS. 2-6 relate to methods for receiving a plurality of power output strategies from a plurality of vehicles driving at tracks at a central server of a wireless network. Each power output strategy may be correlated, by a processor of the central server, to a corresponding user profile stored in a database. In response to a vehicle arriving at a track, the method further includes selecting a power output strategy for the vehicle at a track and implementing the power output strategy via a controller of the vehicle wirelessly coupled to the central server, wherein the power output strategy is based on one or more of a previous lap completed at the track by the vehicle, a plurality of power output strategies from a plurality of vehicles driving at the track, a plurality of inputs provided by a user to the central server via an application, and a vehicle manufacturer setting.

In some examples, prior to the user arriving at the track, the method may include sending the user a checklist prior to a track day at the track, wherein the checklist includes one or more items stored in association with a user profile associated with the user along with one or more items stored in association with users at the track. In one example, the items may be manually input by the user to their user profile, wherein the checklist may send reminders prior to a track day to bring the items. Additionally or alternatively, the user may purchase items through a marketplace of the application of the central server, wherein purchases through the marketplace may be automatically added to the user profile.

In response to the track day being complete, the method may include generating a post-track day debriefing in response to a track day being complete, the post-track day briefing stored in association with a user profile associated with the user, wherein the post-track day debriefing comprises lap times, section times, tire pressures, cooling system conditions, component temperatures, and component wear. A plurality of post-track day debriefings may be stored in association with the user profile so that the user may analyze previous track times, vehicle system settings, items used, and so on relatively quickly and easily.

The method may further include where the user may customize the power output strategy via adjustable parameters provided via the application. In one example, the user may provide the plurality of inputs via one or more of an infotainment system of the vehicle, a smart phone, a tablet, and a laptop, wherein the inputs may adjust one or more parameters corresponding to the power output strategy. The methods below of FIGS. 2-6 further describe the application in greater detail.

Figure 2:
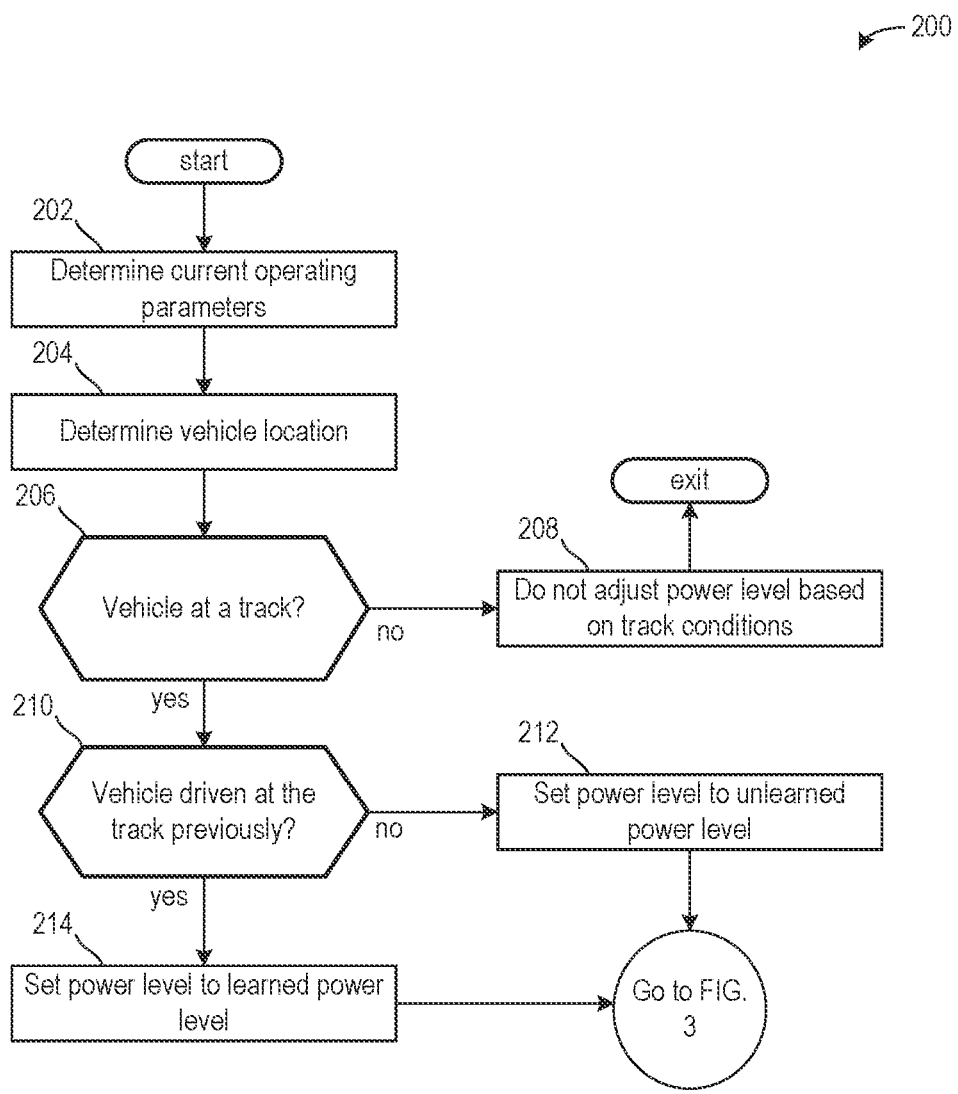
FIG. 2 illustrates a method for determining a geolocation of a vehicle.

Turning to FIG. 2, it shows a method 200 for determining a location of a vehicle. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 200 begins at 202, which includes determining, estimating, and/or measuring current operating parameters. Current operating parameters may include, but are not limited to, one or more of a throttle position, an engine speed, an engine temperature, a vehicle speed, an exhaust gas recirculate (EGR) flow rate, a battery SOC, and an air/fuel ratio.

At 204, the method 200 may include determining a vehicle location. The vehicle location may be determined based on feedback from a navigation system, a GPS device, or other geolocating device of the vehicle. Additionally or alternatively, the vehicle location may be determined based on feedback from a smartphone, laptop, tablet, and/or other mobile device. In some example, the vehicle location may be associated with a geofenced area. The geofenced area may include one or more of a school, a hospital, a park, a city, a rural area, a suburb, a gravel road, a dirt road, a beach, and a track. As described above, the track may be a closed race course separate from other geofenced locations. The track may be a loop along which there may be no speed limits, traffic lights, and other road laws.

At 206, the method 200 may include determining if the vehicle is at a track. If the vehicle is not at the track, then at 208, the method 200 may include not adjusting a vehicle output power level based on track conditions. In one example, the vehicle output power level may be based on a manufacturer default setting.

If the vehicle is at the track, then at 210, the method 200 may include determining if the vehicle has previously driven at the track. In one example, a track history may be stored in memory of the controller or in a user profile via a database. For example, if the user has driven at the track, previous track times and power output strategies may be stored in the user profile and accessed via the controller of the vehicle. If the vehicle has not been driven at the track, then at 212, the method 200 may include setting a power output strategy to an unlearned power output strategy. In one example, the unlearned power output strategy is a manufacturer default power level corresponding to increased power output desired at a track relative to driving outside the track. As such, the unlearned power output strategy may include power outputs higher than those provided during other driving conditions at other geofenced locations. Additionally or alternatively, the unlearned power output strategy may correspond to a higher user aggressiveness without modifying power outputs to correspond to various lap sections. The higher user aggressiveness may be learned at a different track or may be learned at some other geofenced location. In one example, the power output strategy is an electric power output strategy configured to regulate consumption of electrical energy during a lap based on previous driving conditions during the lap by adjusting various settings and actions of the control system, such as adjusting a maximum allowed discharge rate of a battery, adjusting a maximum allowed current over time delivered to the electric motor.

At 214, the method 200 may include setting the power output strategy to a learned power output strategy. The learned power output strategy may be based on a previously executed lap at the track. In one example, the previously executed lap corresponds to a lap including a highest requested power output. For example, if the user previously executed multiple laps at the track, the learned power outputs may then be equal to a highest power output desired during one of the previously executed laps. In some examples, the learned power output strategy may be adapted based on highest requested power outputs demanded across different laps at one track. For example, the user may demand different power outputs at different segments across different laps. The controller may model the different power outputs and determine a highest possible power output, which may correspond to the learned power output strategy at a given track. The modeling may include determining changes in temperatures, battery SOC, component wear, and the like to optimize the combined power outputs into a power output strategy configured to complete the lap at a fastest time. Additionally or alternatively, the learned power output strategy may be based on a data received from other vehicles driven at the track. In one example, the learned power level is based on a fastest lap time executed at the track by the user or a different user.

The power output strategy may correspond to a battery discharge during a lap, wherein the battery discharge is based on one or more of a battery SOC, powertrain temperatures, external conditions, user preferences, and driver behavior. For example, the lap may include various section in which the battery discharge may be modified based on the above conditions. The power output strategy may be predetermined prior to beginning the lap, wherein during the lap, additional power output sections and power limitation sections may be determined to modify the power output strategy for subsequent laps. The power output strategy may be modified during a lap, in some examples, due to powertrain temperatures being greater than desired or due to the battery SOC being less than a lower threshold SOC, wherein the lower threshold SOC is based on a minimum SOC needed to complete the lap. As described above, the power output strategy may be modified due to the battery SOC being less than a desired threshold SOC, a powertrain temperature being less than a desired powertrain temperature, and so on. The desired threshold SOC may be equal to a SOC desired to complete the lap based on the power output strategy. If the SOC is less than the desired threshold SOC, then the power output strategy may be modified to decrease power output in some sections of the lap. The desired powertrain temperature may be based on a desired starting powertrain temperature assuming increased powertrain component temperatures due to driving along the lap.

In this way, the power output strategy may be a set of predetermined parameters based on one or more of the above described conditions. The power output strategy may be modified to a customized strategy, as will be described below, to a limited strategy, or to a maximum power output strategy.

Figure 3:
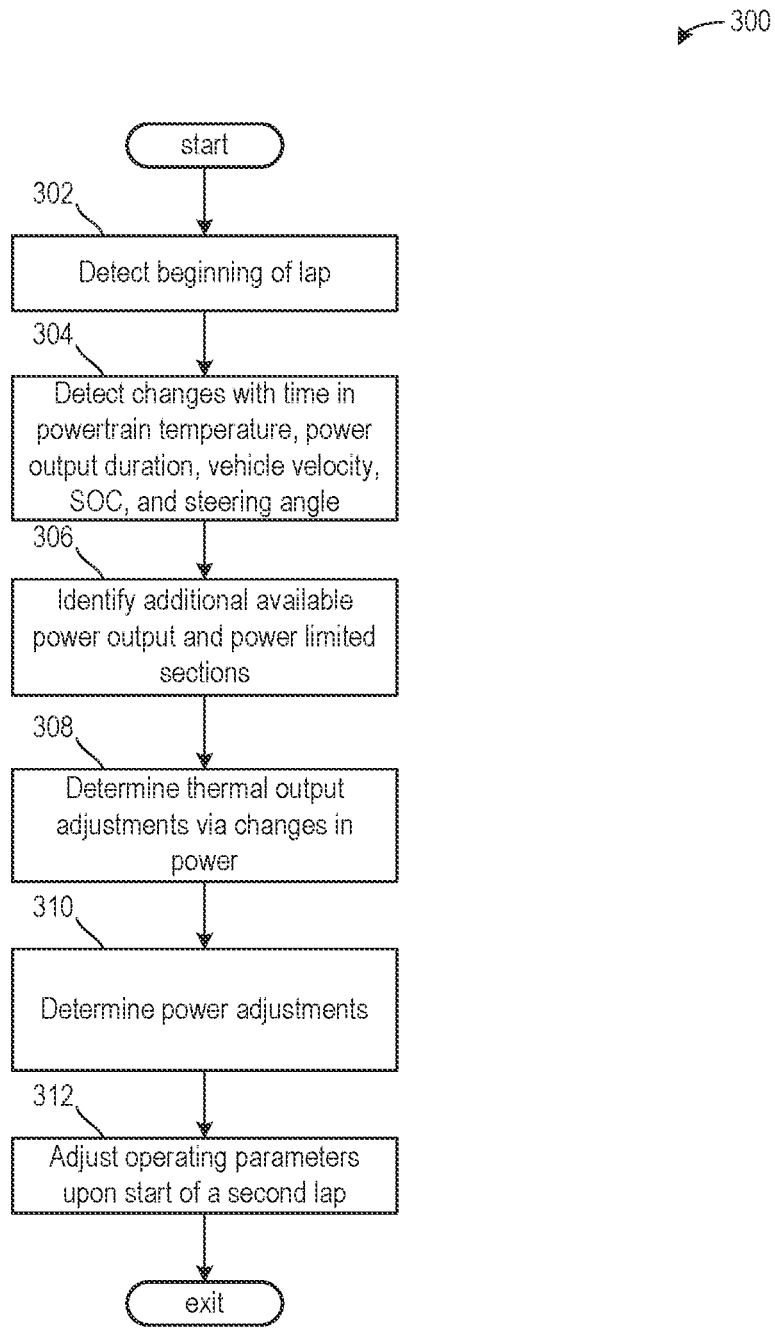
FIG. 3 illustrates a method adjusting a power output of a vehicle at a track.
Figure 4:
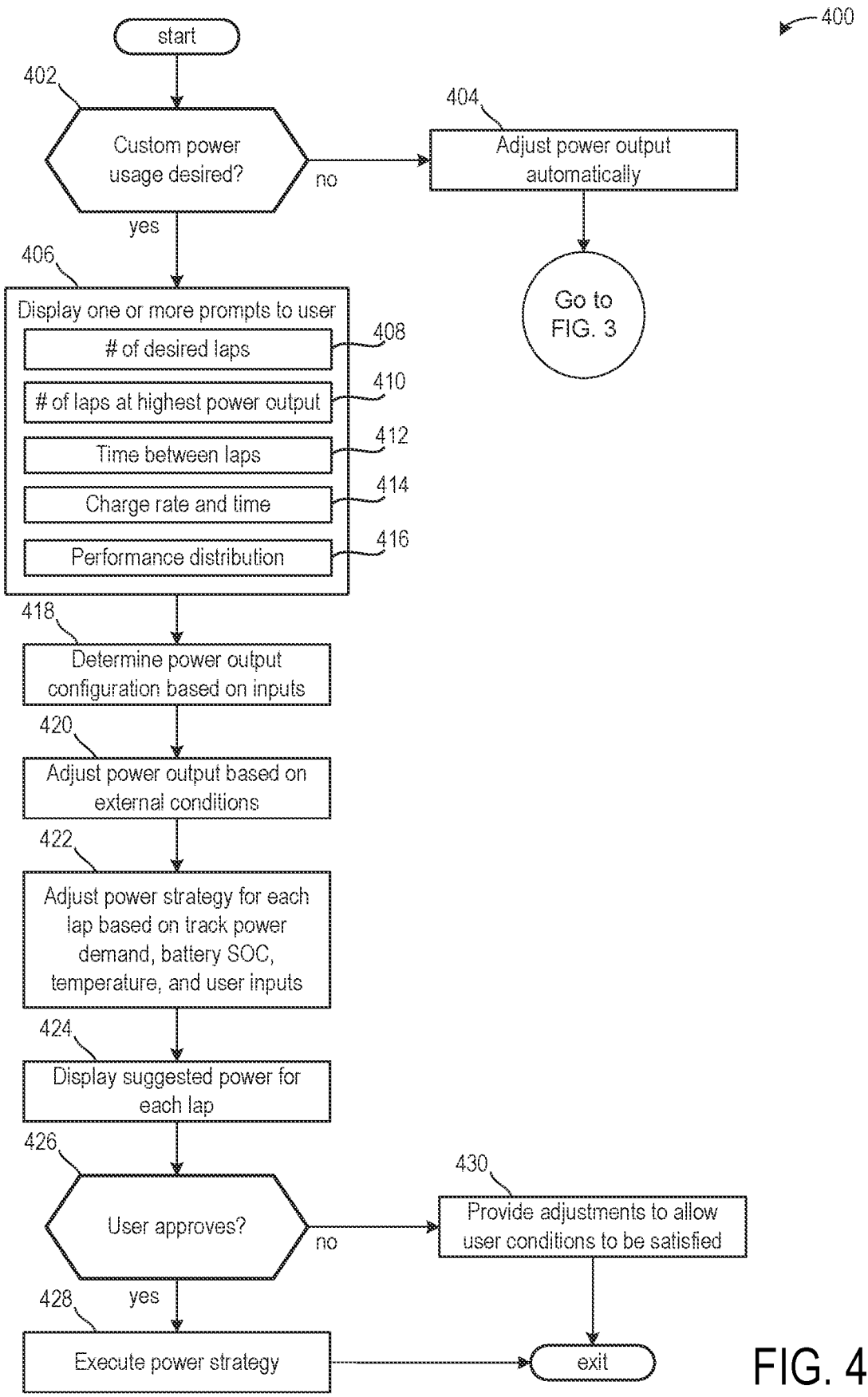
FIG. 4 illustrates a method for adjusting the power output automatically or based on user provided inputs.

The desired power output strategy may be an automatically learned power output strategy (see FIG. 3) or a customized power output strategy based on user inputs (see FIG. 4). It will be appreciated that each lap at each track may be associated with a unique power output strategy. Thus, a power output strategy for a first track may be different than a power output strategy for a second track. Furthermore, a power output strategy for a first user at the first track may be different than a power output strategy for a second user at the first track.

Following designation of the power output strategy to the unlearned power output strategy at 212 or the learned power output strategy at 214, the method 200 may transition to step 302 of method 300 of FIG. 3. At 302, the method 300 may include detecting the beginning of a lap. In one example, the beginning of the lap may be signaled by the user through the infotainment system, the smart phone, and/or a timing device. Additionally or alternatively, a GPS device may detect a current geographic location of the vehicle indicating that the vehicle is at a beginning of the lap. Additionally or alternatively, the beginning of the lap may be determined based on one or more pedal positions.

At 304, the method 300 may include detecting changes with time in powertrain temperature, power output duration, vehicle velocity, SOC, and steering angle. The changes in time may be tracked along different portions of the lap, such as different lap segments or lengths. In one example, the controller may detect changes with time of the steering angle, velocity, acceleration, power output duration, SOC, with respect to a temperature of one or more powertrain subsystem components such as an electric machine, a battery, and the like.

At 306, the method 300 may include identifying additional available power output sections and power limited sections. Additional available power output sections may include sections of the lap where more power output may be provided. Operating parameters in the sections may include a relatively low steering angle and/or a vehicle speed less than a threshold speed. Additional available power output sections may further be determined based on an available power output of the vehicle, which may correspond to a difference between a power output during the section and a maximum available output power of the vehicle. In some examples, the maximum available output power of the vehicle may be based on one or more of a remaining distance of the lap, a current SOC, and various powertrain temperatures, such as a temperature of the battery and the electric motor. Power limited sections may include areas of the track where less than a maximum amount of available power is used. Power limited sections may include where powertrain temperatures are higher than desired, the SOC is less than a desired SOC, and so on.

In one example, the additional available power output may be determined based on the vehicle beginning the lap with 100% SOC and powertrain temperatures being within desired temperature ranges. The sections where additional power output is available may be determined based on the parameters described above. A value of the additional power output may be estimated based on a decay of the SOC and an increase of the powertrain temperatures from the start of the lap to the section. The value may be further determined based on an amount of SOC needed to complete a remainder of the lap and further estimates of powertrain temperature changes for the remainder of the lap.

At 308, the method 300 may include estimate thermal output adjustments via changes in power. For example, the additional power available, which may be equal to the difference between the power output during the section and the maximum available power output, may generate more heat if provided. The controller may estimate the thermal output of the additional power based on data stored in a multi-input look-up table, wherein inputs include power output, weather, powertrain starting temperatures, and the like. The thermal output may be added to current powertrain temperatures and compared to respective thresholds. For example, an increased temperature associated with the additional power may be applied to a temperature of the electric motor, wherein the temperature corresponds to a temperature at the section. If the total temperature (e.g., the temperature plus the increased temperature) exceeds a desired temperature of the electric motor, then a value of the additional power may be reduced until the temperature is less than or equal to the desired temperature. Additionally or alternatively, the thermal output may be reduced based on power reductions corresponding to power limited sections. Thus, a total thermal output adjustment may be based on a sum of the heat generated due to additional power outputs and heat reduced due to reduced power outputs.

At 310, the method 300 may include determining power adjustments. The additional power to be added may be further based on desired additional power outputs with respect to other sections of the lap. For example, if additional power is available for greater than one section of the lap, then the controller may determine a change in SOC of the battery along with a change in powertrain temperatures to determine additional power to be added to each section. In one example, the additional power to be added may be less than a total available power due to the changes in SOC and powertrain temperatures. As another example, the additional power to be added may be equal to the total available power if the sections are distant to one another, if the SOC is expected to increase between the sections, and/or if the additional power requested is relatively low such that the change in SOC and the powertrain temperatures is low relative to values prior to the additional power being added. The power limitations (e.g., power reductions) may be implemented in certain sections based on powertrain temperatures and SOC. In one example, the power limitations and additional power may be balanced such that an overall lap time is improved. For example, the power limitations may be added to sections where power limitations were not desired in order to increase power in other sections. By doing this, the lap time may be reduced while the powertrain temperatures and SOC may remain within desired limits.

At 312, the method 300 may include adjusting operating parameters upon a start of a second lap. In one example, the second lap is identical to the first lap. The second lap may occur after the first lap during the same track day or a future track day. In some examples, additionally or alternatively, the operating parameters may be further adjusted in response to a delay between the second lap and the first lap. For example, if the second lap occurs immediately after the first lap, then operating parameters may be adjusted to reduce power output during some sections of the lap due to a lower SOC and higher powertrain temperatures. As another example, if the second lap occurs following a delay subsequent the first lap, where the SOC is replenished to 100% and powertrain temperatures are cooled relative to temperatures achieved during the first lap, then the operating parameters may be adjusted to include higher power outputs relative to less or no delay between laps.

Turning now to FIG. 4, it shows a method 400 for adjusting a power output strategy in response to inputs from the user. The inputs from the user may customize the power output strategy to change power output for an entirety of some laps or during sections of some laps to maximize power output during other laps and/or sections of laps.

At 402, the method 400 may include determining if a custom power usage is desired. A prompt may be provided to the user via an infotainment system, a text, an email, a phone call, or other method of message delivery. The user may signal that customization is desired (e.g., through a touch-screen of the infotainment system, the smart phone, or the like). The customization may be stored in the user profile associated with the user via the processor and the database of the central server.

If customization is not desired, then at 404, the method 400 may include adjusting the power output automatically based on the method 300 of FIG. 3. If customization is desired, then at 406, the method 400 may include displaying one or more prompts to the user. In one example, the controller may signal to the display the prompts on a display device of the infotainment system or on a display of a portable device, such as a smartphone. The prompts may include one or more of a number of desired laps at 408, a number of laps desired to include a highest power output strategy at 410, a time (e.g., a delay) between laps at 412, a charge rate and time at 414, and a performance distribution at 416. The number of desired laps 408 may correspond to a number of desired laps planned to be executed within a track day. In one example, as the number of desired laps increases, then the power output strategy may be adjust to decrease power outputs during each lap relative to completing fewer laps or only one lap. The number of laps desired to include a highest power output strategy 410 may be based on a desired consistency across the laps or to maximize performance for a certain subset of laps. The performance distribution 416 may be based on certain sections of the lap being prioritized over others. For example, the user may prefer power to be maximized during straighter sections of the lap and conserved during turns or other technical sections of the lap.

At 418, the method 400 may include determining a power output strategy based on the inputs. In some examples, the power output strategy may be adjusted relative to the learned power output strategy. Additionally or alternatively, the power output strategy may be identical to the learned power output strategy. The power output strategy may be customized based on the inputs, wherein the customized power output strategy may be stored in the user profile of the user, if requested. In some example, the power output strategy may be customized for a specific event at a track. For example, during track days where an event is not occurring, the user may prefer automatically determining the power output strategy, whereas during track days where an event is occurring, the user may customize the power output strategy to meet guidelines of the event. User preferences may be stored in the user profile such that previous power output strategies for the track are still accessible for future track day events.

At 420, the method 400 may include adjusting the power output strategy based on external conditions. For example, the power output strategy may be based on desired ambient conditions, which may include dry, temperate, low wind conditions. If the external conditions include rain, snow, high winds, excessive heat, road surface quality (potholes, loose gravel, etc.), etc. then external conditions may be degraded relative to desired ambient conditions, which may reduce the power output strategy. In some examples, the power output strategy may be conservatively determined based on an average between desired and undesired external conditions. By doing this, the power output strategy may include increasing power outputs in response to external conditions improving. This may improve customer satisfaction.

At 422, the method 400 may include adjusting a power output strategy for each lap based on user inputs, track power demands, SOC, and powertrain temperatures. In one example, the power output strategy may be adjusted to increase a power output in response to one or more of a lower number of desired laps, a lower number of desired laps including the highest power output, higher SOCs, lower powertrain temperatures, higher charge rates and longer charge times, and a greater amount of time between laps. As another example, the power output strategy may be adjusted to decrease the power output strategy in response to one or more of a higher number of desired laps, a higher number of desired laps including the highest power output, lower SOCs, higher powertrain temperatures, lower charge rates and shorter charge times, and a shorter amount of time between laps.

At 424, the method 400 may include displaying the power output strategy for each lap. In one example, the displaying may include estimated lap times, estimated section times, estimated powertrain temperatures, estimated coolant volumes, estimated battery SOC, and the like. The displaying may further include demanded charge rates and times, delays between consecutive laps, and the like.

At 426, the method 400 may include determining if the user approves the customized power output strategy. If the user approves, then at 428, the method 400 may include executing the customized power output strategy at the start of the lap. In one example, the customized power output strategy may be saved to the user profile and associated therein with the specific track. Other vehicles at the track may utilize the customized power output strategy via selecting the strategy through a menu of the application. In one example, a plurality of vehicles may be present at the track competing in an event. The user may be an organizer of the event and provide a recommended strategy for the event via customizing the power output strategy via the application.

If the user does not approve, then at 430, the method 400 may include providing adjustments to one or more track day conditions to allow user conditions to be satisfied. For example, if the user desires a power output strategy with a higher power output, then adjustments to the track day may include executing a fewer number of laps, executing a fewer number of laps with a highest power output, increasing time between laps, and increasing a charge rate and/or time. Additionally or alternatively, adjustments may further include hardware adjustments such as new tires, adjusting tire pressures, replacing one or more powertrain components, and the like. As will be described in greater detail below, various vehicle components and user devices may be tracked and stored in the user profile of the application. The application may track a remaining useful life of various vehicle components and user devices while also setting reminders to bring certain devices and to perform maintenance on one or more vehicle components.

Figure 5:
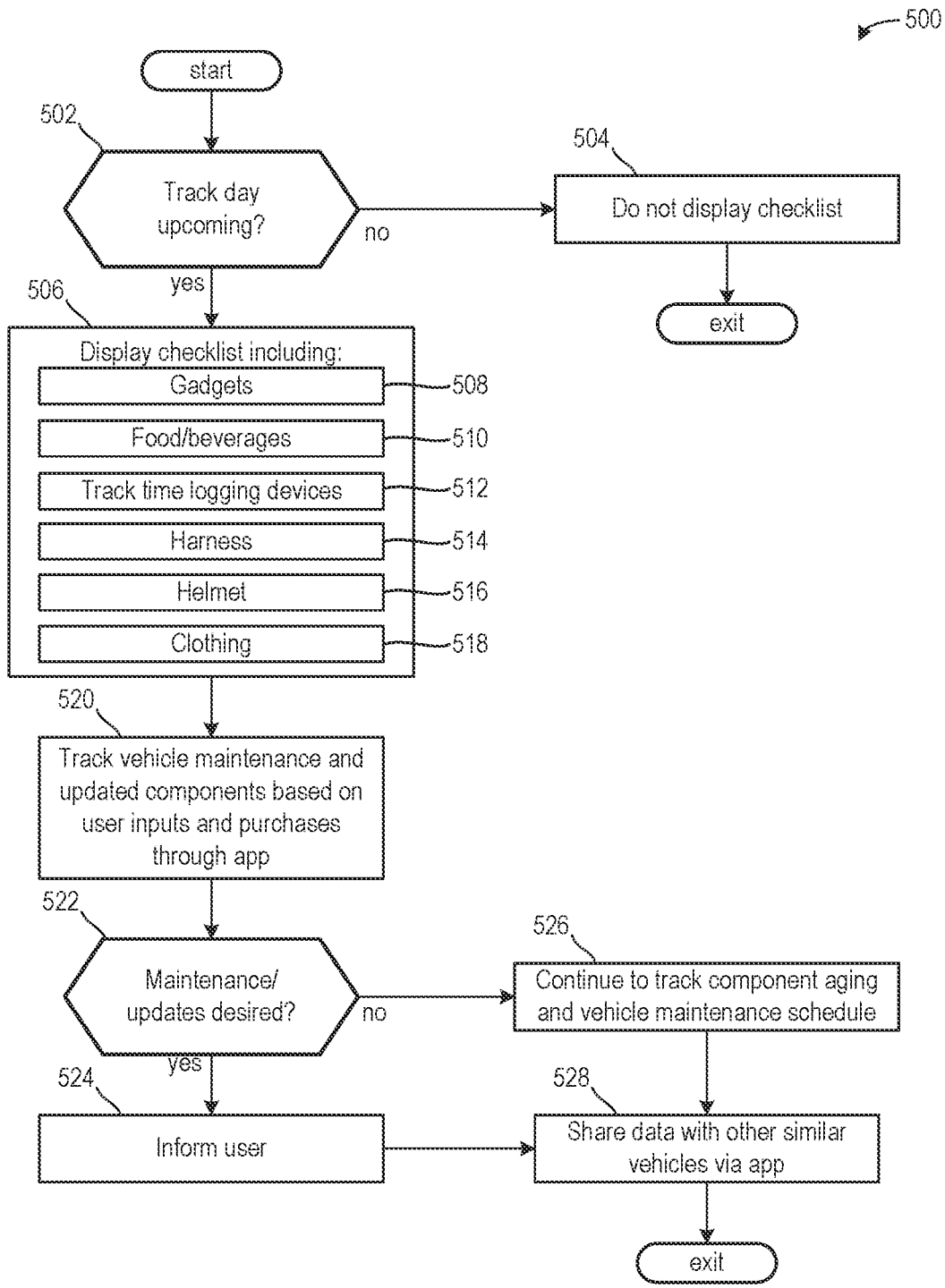
FIG. 5 illustrates a method for displaying a pre-track day checklist.

Turning now to FIG. 5, it shows a method 500 for providing a track day check list along with notifying the user about one or more maintenance requests.

At 502, the method 500 may include determining if a track day is upcoming. The track day may be upcoming if the track day will occur within a threshold number of days. The threshold number of days may be a default value or a value defined by the user. In one example, the threshold number of days may be equal to one day, three days, five days, seven days, 14 days, 21 days, and so on. In one example, the application may include a calendar, a message system, or the like which may indicate if a track day is upcoming. Additionally or alternatively, the track day may be upcoming based on one or more user behaviors, such as vehicle maintenance, items being purchased, vehicle modifications, and the like.

If the track day is not upcoming, then at 504, the method 500 may include not displaying the checklist. As such, a checklist including items and/or prompts related to track day activities may not be displayed on a display device.

If the track day is upcoming, then at 506, the method 500 may include displaying the checklist. The checklist may include gadgets 508, food and/or beverages 510, track time logging devices (e.g., a stopwatch) 512, a harness 514, a helmet 516, and clothing 518. In one example, the user may define one or more parameters regarding the checklist via the user profile. In one example, the user may add/delete one or more checklist items. Additionally or alternatively, the user may customize one or more of the checklist items to be more or less specific. For example, the user may modify the food and/or beverages to specify a type of food and/or a specific beverage to bring to the track.

At 520, the method 500 may include tracking vehicle maintenance and updated components based on user inputs and purchases through the application. In one example, the user may schedule maintenance at a desired service center via the application. In some examples, the user may store payment information (e.g., credit card information, debit card information, bank account information, etc.) in a wallet of the application. As such, the user may electronically pay for vehicle maintenance without a physical card or paper money. Additionally or alternatively, the application may include a marketplace including items for the user to purchase. The items may include clothing, vehicle components, track day tickets, vehicle fluids, tires, and the like. The application may save the various purchases and maintenances to the user profile. The application may be further configured to track a usage of the vehicle components along with other various items used by the user (e.g., helmet, apparel, harness, etc.). The application may further include a marketplace in which the user may sell one or more items to other users. By tracking usage of the items, customers in the marketplace may receive accurate information regarding wear and usage of the items.

At 522, the method 500 may include determining if maintenance and/or updates is/are desired. The application may receive data from other vehicles and/or the vehicle manufacturer with regard to when maintenance and/or updates is/are desired. In some examples, defaults vehicle manufacturer settings may be updated based on data stored in a cloud with regard to vehicles demanding maintenance before/after the manufacturer set date. For example, identical vehicles with similar vehicle operator characteristics including sex, age, driver behavior, weight, home location, and the like may adjust scheduled maintenance and/or updates based on average maintenance and/or update requests.

If maintenance and/or updates is/are desired, then at 524, the method 500 may include informing the user. The controller may inform the user via the display device and/or via a text, an email, or a phone call.

If maintenance and/or updates is/are not desired, then at 526, the method 500 may include continuing to track component aging and a vehicle maintenance schedule. At 528, following 524 and 526, the method 500 may include sharing data with other similar vehicles via the application. As described above, if a vehicle maintenance is requested before the vehicle manufacturer set date, then the earlier date may be shared with other identical vehicles with similar operator characteristics and a maintenance date may be adjusted, in one example.

Figure 6:
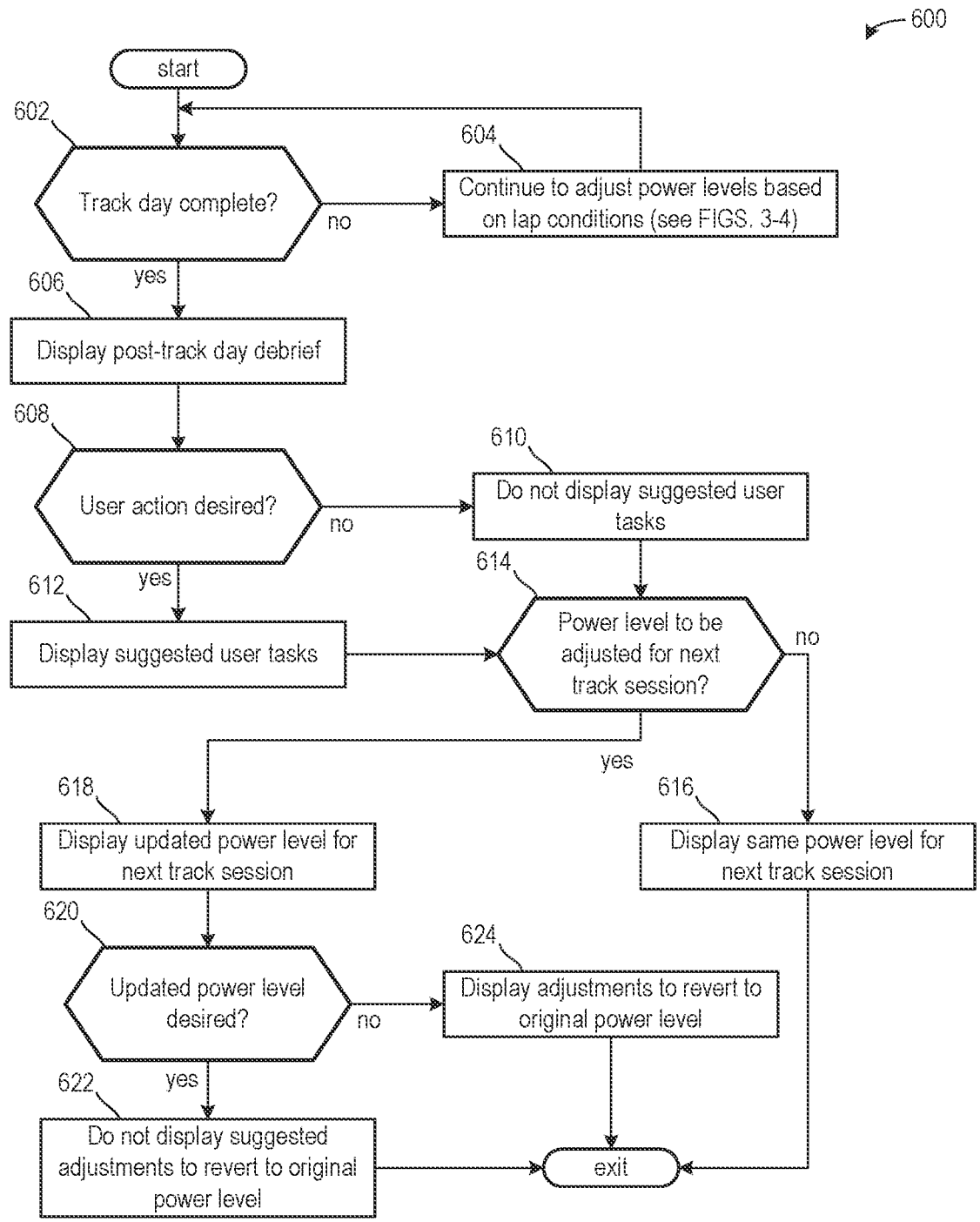
FIG. 6 illustrates a method for displaying a post-session debriefing.

Turning now to FIG. 6, it shows a method 600 for displaying a post-track day debrief. At 602, the method 600 includes determining if the track day is complete. The track day may be complete if all desired laps are completed. Additionally or alternatively, the track may be determined to be complete if the vehicle location is outside the track, if a time of day is outside an operating time of the track, and/or if a threshold duration has elapsed since a previous lap. The threshold duration may be a non-zero, positive number. In one example, the threshold duration is 12 hours, however, other values may be used. In some examples, the threshold duration may be user defined.

If the track day is not complete, then at 604, the method 600 may include continuing to monitor and adjust power output based on lap conditions, as described above with respect to FIGS. 3 and 4.

If the track day is complete, then at 606, the method 600 may include displaying a post-track day debrief. The post-track day debrief may be displayed on the display device of the vehicle and/or may be sent to the user via a text and/or email. Additionally or alternatively, the post-track day debrief may be included in the user profile in the application. The post-track day debrief may include details regarding lap times, section times, tire pressure, cooling system conditions, component temperatures, component wear, and other priority conditions.

At 608, the method 600 may include determining if user action is desired. User action may be desired if maintenance is requested or it vehicle upkeep is desired. If user action is not desired, then at 610, the method 600 may include not displaying suggested user tasks. If user action is desired, then at 612, the method 600 may include displaying suggest user tasks. Suggested user tasks may include pumping tires, replacing tires, changing oil, changing coolant, repairing/replacing one or more vehicle components, and the like.

Following 610 and 612, at 614, the method 600 may include determining if a power level is to be adjusted for a next track day session. The power level may be adjusted in response to the user modifying their behaviors or actions on the vehicle during the track day. For example, if the user includes longer delays between laps, then a power output strategy for the next track day may include increasing the power level. As another example, if the user does not perform an action task, then the power output strategy may include decreasing the power level for the next track day.

If the power level is not going to be adjusted for the next track day session, then at 616, the method 600 may include displaying a same expected power output strategy for the next track session. If the power level is going to be adjusted for the next track day session, then at 618, the method 600 may include displaying the updated expected power output strategy for the next track session.

At 620, the method 600 may include determining if the updated power output strategy is desired. The user may select if the updated power output strategy for the next track day is desired or desired. If the updated power output strategy is desired, then at 622, the method 600 may include not providing suggested adjustments to the vehicle or user actions to revert to the original power output strategy.

If the updated power output strategy is undesired, then at 624, the method 600 may include providing tasks to revert to the original power output strategy. Adjustments may include longer delays between laps, longer recharge times or higher charge rates, or various component adjustments.

In this way, the application may provide the user feedback between and within track day sessions to provide enhanced vehicle performance. The application, in combination with vehicle hardware, may automatically determine a power output strategy. Additionally or alternatively, the user may provide inputs to the application to customize the power output strategy based on track day events and/or conditions. The application may further provide the user with a pre-track day checklist and a post-track day debrief. By doing this, the user may be less likely to forget key items while also being able to disseminate information regarding the track day quickly. The technical effect of the application is to improve a track day experience by providing the user options to customize vehicle operating parameters. Another technical effect of the application is to track usage of various items and vehicle components to monitor wear and requested maintenance schedules.

FIG. 1 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

The disclosure provides support for a method for a vehicle with a traction battery, including adjusting a power output strategy of the battery automatically or based on user inputs via an application, wherein the power output strategy is for one or more laps at a track. A first example of the method further includes where adjusting the power output strategy automatically comprises identifying sections of a lap of the track comprising additional available power output or power limitations, and adjusting the power output strategy for a subsequent lap based on the additional power output or power limitations. A second example of the method, optionally including the first example, further includes where providing a checklist prior to a track day, wherein the checklist comprises one or more reminders including items to bring to the track along with requested vehicle maintenance actions. A third example of the method, optionally including one or more of the previous examples, further includes where providing a post-track day debrief, wherein the post-track day debrief comprises one or more of an average lap time, an average section time, tire pressure, cooling system conditions, component temperatures, and component wear. A fourth example of the method, optionally including one or more of the previous examples, further includes where the application further comprises a user profile, wherein a plurality of power output strategies corresponding to different tracks are stored in the user profile. A fifth example of the method, optionally including one or more of the previous examples, further includes where adjusting the power output strategy further comprising adjusting the power output strategy in response to a power output strategy of a different vehicle at the track. A sixth example of the method, optionally including one or more of the previous examples, further includes where the different vehicle is identical to the vehicle in make and model, and wherein users of the different vehicle and the vehicle comprise similar characteristics comprising one or more of sex, age, driver behavior, and weight.

The disclosure further provides support for a system including a vehicle including a traction battery and an electric motor and a controller comprising instructions stored in memory that cause the controller to in response to the vehicle being located at a track, setting a power output strategy based on one or more of a previous lap at the track, a lap executed by a different vehicle at the track, one or more user inputs, or a default power output strategy, and updating a user profile to include the power output strategy, wherein the user profile is in an application executed via a processor including instructions stored in memory, and wherein the controller is wirelessly coupled to the processor. A first example of the system further includes where the instructions further cause the controller to provide a checklist prior to an upcoming track day, wherein the checklist include reminders regarding one or more items comprising food, a harness, a helmet, a timer, gadgets, and clothing. A second example of the system, optionally including the first example, further includes where the one or more items are stored in the user profile, and wherein usage of the one or more items is tracked. A third example of the system, optionally including one or more of the previous examples, further includes where the instructions further cause the controller to provide a post-track day debrief, wherein the post-track day debrief comprises lap times, section times, tire pressure, cooling system conditions, component temperatures, and component wear. A fourth example of the system, optionally including one or more of the previous examples, further includes where the instructions further cause the controller to automatically adjust the power output strategy based on sections of the lap comprising additional power output or power limitations. A fifth example of the system, optionally including one or more of the previous examples, further includes where the instructions further cause the controller to customize the power output strategy in response to the one or more user inputs, wherein the one or more user inputs comprise a number of desired laps, a number of laps desired with a highest power output, a time between laps, a charge rate and time, and a performance distribution. A sixth example of the system, optionally including one or more of the previous examples, further includes where the customized power output strategy is further based on additional thermal energy generated, a battery state-of-charge (SOC), and external conditions. A seventh example of the system, optionally including one or more of the previous examples, further includes where the application further comprises tracking a vehicle maintenance schedule based on at least usage of the vehicle at the track along with a maintenance schedule of the different vehicle The disclosure further provides support for a method including receiving a plurality of power output strategies from a plurality of vehicles driving at tracks at a central server of a wireless network, correlating each power output strategy via a processor of the central server to a user profile stored in a database, and selecting a power output strategy for a vehicle at a track via a controller of the vehicle wirelessly coupled to the central server, wherein the power output strategy is based on one or more of a previous lap completed at the track by the vehicle, the plurality of power output strategies from the plurality of vehicles driving at the track, a plurality of inputs provided by a user to the central server via an application, and a vehicle manufacturer setting. A first example of the method further includes sending the user a checklist prior to a track day at the track, wherein the checklist includes one or more items stored in association with the user profile associated with the user along with one or more items stored in associated with users at the track. A second example of the method, optionally including the first example, further includes generating a post-track day debriefing in response to a track day being complete, the post-track day briefing stored in association with the user profile associated with the user, wherein the post-track day debriefing comprises lap times, section times, tire pressure, cooling system conditions, component temperatures, and component wear. A third example of the method, optionally including one or more of the previous examples, further includes where the plurality of inputs is provided via one or more of an infotainment system of the vehicle, a smart phone, a tablet, and a laptop. A fourth example of the method, optionally including one or more of the previous examples, further includes where the user profile is one of a plurality of user profiles of the application of the central server, and wherein the application further comprises a marketplace through which users purchase or sell vehicle components, apparel, and equipment, and wherein payment options are stored in association with the user profile.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle with a traction battery, comprising:
    adjusting, via a controller of the vehicle, a power output strategy of the traction battery based on user inputs via an application, wherein the power output strategy is for one or more laps at a track, and wherein the user inputs specify a number of desired laps, a number of laps desired with a highest power output, a time between laps, and a charge rate and time; and
    implementing, via the controller of the vehicle, the power output strategy to regulate consumption of electrical energy stored in the traction battery during the one or more laps.

2. The method of claim 1, wherein implementing the power output strategy includes controlling a maximum allowed discharge rate of the traction battery and/or controlling a maximum allowed current over time delivered to an electric motor of the vehicle.

3. The method of claim 1, further comprising providing a checklist prior to a track day, wherein the checklist comprises one or more reminders including items to bring to the track along with requested vehicle maintenance actions.

4. The method of claim 1, further comprising providing a post-track day debrief, wherein the post-track day debrief comprises one or more of an average lap time, an average section time, tire pressure, cooling system conditions, component temperatures, and component wear.

5. The method of claim 1, wherein the application further comprises a user profile, wherein a plurality of power output strategies corresponding to different tracks are stored in the user profile.

6. The method of claim 1, wherein adjusting the power output strategy further comprises adjusting the power output strategy in response to a power output strategy of a different vehicle at the track.

7. The method of claim 6, wherein the different vehicle is identical to the vehicle in make and model, and wherein users of the different vehicle and the vehicle comprise similar characteristics comprising one or more of sex, age, driver behavior, and weight.

8. A system, comprising:
    a vehicle including a traction battery and an electric motor; and
    a controller comprising instructions stored in memory that cause the controller to:
    in response to the vehicle being located at a track:
        set a power output strategy based on one or more user inputs, wherein the one or more user inputs specify a number of desired laps, a number of laps desired with a highest power output, a time between laps, and a charge rate and time;
        update a user profile to include the power output strategy, wherein the user profile is in an application executed via a processor including instructions stored in memory, and wherein the controller is wirelessly coupled to the processor; and
        implement the power output strategy to regulate consumption of electrical energy stored in the traction battery while the vehicle is operated for one or more laps at the track.

9. The system of claim 8, wherein the instructions further cause the controller to provide a checklist prior to an upcoming track day, and wherein the checklist include reminders regarding one or more items comprising food, a harness, a helmet, a timer, gadgets, and clothing.

10. The system of claim 9, wherein the one or more items are stored in the user profile, and wherein usage of the one or more items is tracked.

11. The system of claim 8, wherein the instructions further cause the controller to provide a post-track day debrief, and wherein the post-track day debrief comprises lap times, section times, tire pressure, cooling system conditions, component temperatures, and component wear.

12. The system of claim 8, wherein the instructions further cause the controller to automatically adjust the power output strategy based on sections of the lap comprising additional power output or power limitations.

13. The system of claim 8, wherein the implementing includes controlling a maximum allowed discharge rate of the traction battery and/or controlling a maximum allowed current over time delivered to the electric motor of the vehicle.

14. The system of claim 8, wherein the power output strategy is further based on additional thermal energy generated, a battery state-of-charge (SOC), and external conditions.

15. The system of claim 8, wherein the application further comprises tracking a vehicle maintenance schedule based on at least usage of the vehicle at the track along with a maintenance schedule of the different vehicle.

16. A method, comprising:
    receiving a plurality of power output strategies from a plurality of vehicles driving at tracks at a central server of a wireless network;
    correlating each power output strategy via a processor of the central server to a respective user profile stored in a database;
    customizing a power output strategy for a vehicle at a track, the vehicle including a controller wirelessly coupled to the central server, wherein the power output strategy is customized based on a plurality of inputs provided by a user to the central server via an application, the plurality of inputs specifying a number of desired laps, a number of laps desired with a highest power output, a time between laps, and a charge rate and time;

storing the customized power output strategy in a user profile of the user at the central server; and implementing the customized power output strategy via the controller of the vehicle to regulate consumption of electrical energy stored in a traction battery of the vehicle while the vehicle is operated for one or more laps at the track, the implementing including controlling a maximum allowed discharge rate of the traction battery and/or controlling a maximum allowed current over time delivered to an electric motor of the vehicle.

17. The method of claim 16, further comprising sending the user a checklist prior to a track day at the track, wherein the checklist includes one or more items stored in association with the user profile associated with the user along with one or more items stored in associated with users at the track.

18. The method of claim 16, further comprising generating a post-track day debriefing in response to a track day being complete, the post-track day briefing stored in association with the user profile associated with the user, wherein the post-track day debriefing comprises lap times, section times, tire pressure, cooling system conditions, component temperatures, and component wear.

19. The method of claim 16, wherein the plurality of inputs is provided via one or more of an infotainment system of the vehicle, a smart phone, a tablet, and a laptop.

20. The method of claim 16, wherein the user profile is one of a plurality of user profiles of the application of the central server, wherein the application further comprises a marketplace through which users purchase or sell vehicle components, apparel, and equipment, and wherein payment options are stored in association with the user profile.

* * * * *